US011130562B2

United States Patent
van der Linden

(10) Patent No.: US 11,130,562 B2
(45) Date of Patent: Sep. 28, 2021

(54) REDUCING GUST LOADS ACTING ON AN AIRCRAFT

(71) Applicant: Deutsches Zentrum für Luft- und Raumfahrt e.V., Cologne (DE)

(72) Inventor: Franciscus van der Linden, Munich (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 322 days.

(21) Appl. No.: 16/309,043

(22) PCT Filed: Sep. 15, 2017

(86) PCT No.: PCT/EP2017/073362
§ 371 (c)(1),
(2) Date: Dec. 11, 2018

(87) PCT Pub. No.: WO2018/050866
PCT Pub. Date: Mar. 22, 2018

(65) Prior Publication Data
US 2019/0256195 A1 Aug. 22, 2019

(30) Foreign Application Priority Data
Sep. 19, 2016 (DE) .................. 10 2016 117 638.9

(51) Int. Cl.
*B64C 13/16* (2006.01)
(52) U.S. Cl.
CPC .................. *B64C 13/16* (2013.01)
(58) Field of Classification Search
None
See application file for complete search history.

(56) References Cited

U.S. PATENT DOCUMENTS 3,279,725 A * 10/1966 Andrew ................. B64C 13/16
244/191
3,734,432 A * 5/1973 Low ....................... B64C 13/16
244/191
(Continued)

FOREIGN PATENT DOCUMENTS

DE 102011114222 A1 5/2013
DE 102014108336 A1 12/2015
(Continued)

OTHER PUBLICATIONS

English translation of the International Preliminary Report on Patentability issued in International Application No. PCT/EP2017/073362 dated Mar. 28, 2019.

*Primary Examiner* — Richard R. Green
*Assistant Examiner* — Madison Elizabeth Dittner
(74) *Attorney, Agent, or Firm* — Hoffmann & Baron, LLP

(57) ABSTRACT

Device and method for reducing gust loads acting on control surfaces of an aircraft. Each control surface is movable by at least one actuator, and a flight control system provides reference variables $X_{soll}$ and $\dot{X}_{soll}$ to actuate the actuator of each control surface. $X_{soll}$ indicates a target position, force, or moment of the actuator, and $\dot{X}_{soll}$ indicates a time derivative of $X_{soll}$. The device includes: a first sensor system identifying a position, force, or moment, indicated by variable $F_{ext,Boe}$, as produced by gusts acting from outside on the control surface; and a regulator regulating the actuator of the control surface based on $F_{ext,Boe}$, $X_{soll}$ and $\dot{X}_{soll}$, and $X_A$ and $\dot{X}_A$, resulting from the actuator acting on the control surface and detected by a second sensor system, wherein regulation of the actuator by the regulator enables compensation of the position, force, or moment produced by gusts acting on the control surface.

17 Claims, 2 Drawing Sheets

(56) References Cited

U.S. PATENT DOCUMENTS

| | | | | |
|---|---|---|---|---|
| 4,821,981 A | * | 4/1989 | Gangsaas | B64C 13/16 244/191 |
| 4,829,220 A | * | 5/1989 | Fabre | G05D 1/0607 318/584 |
| 5,135,186 A | * | 8/1992 | Ako | B64C 13/16 244/195 |
| 6,416,017 B1 | * | 7/2002 | Becker | B64C 13/16 244/194 |
| 8,000,847 B2 | * | 8/2011 | Shue | B64C 13/16 701/10 |
| 8,050,780 B2 | | 11/2011 | Tessier et al. | |
| 8,996,205 B2 | * | 3/2015 | Pierre | G05D 1/0066 701/11 |
| 9,242,723 B2 | * | 1/2016 | Wildschek | B64C 13/16 |
| 9,567,066 B2 | * | 2/2017 | Guida | B64C 13/16 |
| 2010/0332052 A1 | | 12/2010 | Ratliff | |
| 2013/0035808 A1 | * | 2/2013 | Golling | B64C 9/38 701/3 |
| 2013/0206916 A1 | * | 8/2013 | Kordt | B64C 9/34 244/203 |
| 2016/0328891 A1 | | 11/2016 | Huynh et al. | |

FOREIGN PATENT DOCUMENTS

| | | |
|---|---|---|
| EP | 1814006 A1 | 8/2007 |
| WO | WO 2009/144312 A1 | 12/2009 |
| WO | WO 2012/168086 A2 | 12/2012 |
| WO | WO 2015/088967 A1 | 6/2015 |

\* cited by examiner

REDUCING GUST LOADS ACTING ON AN AIRCRAFT

CROSS-REFERENCE TO RELATED APPLICATIONS

This application is the U.S. National Phase of International Patent Application No. PCT/EP2017/073362, filed on 15 Sep. 2017, which claims benefit of German Patent Application No. 102016117638.9, filed on 19 Sep. 2016, the contents of which are incorporated herein by reference in their entirety.

BACKGROUND

Field

The invention relates to an apparatus and a method of reducing gust loads acting on an aircraft. Furthermore, the invention relates to an aircraft with such an apparatus.

Related Art

Apparatus for reducing gust loads acting on an aircraft are known. The apparatus typically include an acceleration sensor arranged near the center of gravity of the aircraft for detecting accelerations of the aircraft caused by gusts. Here, the additional acceleration due to gusts is excluded from the total acceleration which acts on the aircraft and particularly in the event of maneuverings contributing to accelerations of the aircraft. For compensating additional loads/accelerations on the aircraft due to gusts, actuators which actuate the aerodynamically effective control surfaces of the aircraft are actively actuated such that the additional load of the gust is compensated. Thus, the required total uplift of the aircraft as well as the bending moment at the wing root (root bending moment) are reduced.

DE102014108336 A1 demonstrates a method for reducing the impact of airflow turbulence on aircrafts and an aircraft regulation unit having a base regulation unit for controlling the flight condition of the aircraft in dependence on predetermined attitude control values, and a swirl air compensation unit for detecting air flow turbulence in the vicinity of the aircraft and for determining compensation values for reducing the influence of the detected airflow turbulence, wherein the output signals of the swirl air compensation unit are linked with the base regulation unit.

DE102011114222 A1 shows an electronic load limitation function for an electromechanical actuator of the flight control. The electronic load limitation function is characterized in that a set load of the actuator is detected electronically and when leaving an allowed load range, a manipulation of signals for regulating the actuator is made such that proceeding the actuator and the relating control surface towards a lower set load occurs, whereby the load is reduced and the nominal regulation is resumed after attenuation of the overload.

WO 2009/144312 A1 shows a system and a method for determining parameters of an aircraft. The calculation system for an aircraft described therein includes at least one sensor for detecting aeroelastic and flight-mechanical movement variables of the aircraft, for detecting positions and movements of the control surfaces of the aircraft or for detecting speeds of gusts of wind acting on the aircraft, as well as a calculation unit which calculates parameters of the passenger comfort and the cabin safety as well as movement variables of the aircraft as a function of the sensor data indicated by the sensors and a non-linear simulation model of the aircraft.

US 2016/0328891 A1 describes a method as well as an apparatus for operating a flight control and regulation of a plane. The suggested apparatus enables the localization of mechanical blockings of a flight control and regulation system of the plane.

U.S. Pat. No. 8,050,780 B2 shows a control system for controlling a joystick with force feedback.

US 2010/0332052 A1 shows a method for identifying a plurality of flight conditions of an aircraft. The method includes detecting a deflection of a control surface of the aircraft by an actuator, detecting a current for actuating the actuator, and estimating flight conditions of the aircraft based on the detected deflection of the control surface as well as the detected current.

SUMMARY

The object of the invention is to provide an apparatus and a method, respectively, which are improved compared with the related art, for reducing gust loads acting on an aircraft, particularly wherein a reduction of gust loads acting on control surfaces should be enabled, without using a central flight guidance computer.

The invention will become apparent from the features of the independent claims Advantageous further developments and embodiments are the subject matter of the dependent claims. Other features, possible applications and advantages of the invention will become apparent from the following description, as well as the explanation of example embodiments of the invention shown in the figures.

A first aspect of the invention relates to an apparatus for reducing gust loads acting on a number n of aerodynamic control surfaces of an aircraft, with n≥1, wherein each aerodynamic control surface is movable by at least one actuator, and a flight control system of the aircraft provides reference variables $X_{soll}$ and $\dot{X}_{soll}$ for actuating the actuator, wherein $X_{soll}$ indicates a target position, a target force, or a target moment, and $\dot{X}_{soll}$ indicates a time derivative of $X_{soll}$.

Herein, the term "aircraft" includes any flight devices which are heavier or lighter than air, particularly fixed-wing aircrafts, helicopters, airships, multicopters, and drones. The aircrafts may be equipped for being controlled by a human and/or have an automatic flight control device which enables an automatic/autonomous operation of the aircrafts.

The term "gust load" generally describes an additional force or moment, respectively, which occurs due to the action of a gust to the aircraft or the floor spaces. As used herein, a "gust load" is an additional force, moment, or position (deflection) due to action of a gust or turbulence on an aerodynamic control surface of the aircraft.

The term "flight control system" advantageously includes a flight computer which identifies and provides the reference variables $X_{soll}$ and $\dot{X}_{soll}$ for actuating the actuator based on specifications (control information). The flight guidance system is advantageously connected to input means which enable inputs by a pilot and thus create $SV_{Pilot}$ specifications (control information). The input means advantageously include rudder pedals for specifying a position of a rudder of the aircraft as well as means for input of a specification of positions of an aileron and/or an elevator. The latter means may particularly be designed as a so-called "side stick", "yoke", or "control lever".

Alternatively or additionally, the flight control system is advantageously connected to a system for automatic flight control which creates $SV_{Autopilot}$ specifications (control information). This system for automatic flight control advantageously includes an autopilot system which is designed and equipped for automatic flight guidance. The specifications: $SV_{Pilot}$ as well as $SV_{AutoPilot}$ advantageously are each vectors, the vector elements of which provide specifications (control information) for each individual actuator and/or a group of actuators. In manned aircrafts, the input means for pilots and the systems for automatic flight control are advantageously present. In unmanned aircrafts (drones), only the system for automatic flight control is advantageously present.

The "actuators" may be particularly: hydraulic actuators, or electromechanically propelled actuators (for example, including an electric motor with and without transmission). Typically, the actuators are connected to the related control surfaces via a mechanism (e.g., drive train) such that the control surfaces may be moved by the actuators. For redundancy reasons, at least two actuators advantageously propel a control surface. The load/air force acting on a control surface is thus transmitted to the actuators connected to the control surface.

Herein, the term "aerodynamic control surfaces" includes any control surfaces articulably and adjustably movable by actuators, which may be induced by a specific movement of the aircraft during the flight, particularly: aileron, rudder, elevator, spoiler, rotor blades, propeller blades, brake flaps, slats, etcetera.

Herein, the term "target position" designates particularly a target longitudinal position or a target angular position of a control surface, drive terrain of the actuator linking to the control surface, or the actuator itself. Herein, the term "target force" designates particularly a target force or a moment to be produced by the at least one actuator. Depending on whether $X_{soll}$ indicates a position, a force, or a moment, respectively, the regulation concept of the regulator described below is defined as position-regulated, force-regulated, or moment-regulated, respectively.

According to the invention, the suggested apparatus has a sensor system (first sensor system) which identifies the forces, moments, or positions (deflections), indicated by variable $F_{ext,Boe}$, as a result of gusts acting from outside the aircraft on a control surface. In this respect, the first sensor system has a sensor, such as a force, moment, or position sensor, which initially detects the total force, moment, or position, respectively, of the control surface. The sensor, can be advantageously arranged in the actuator itself, in the drive train of the respective actuator, or within the connection between the drive train and control surface. With the adequate design and equipment, the respective actuator itself may also be used as a force, moment, or position sensor, respectively. The first sensor system is further advantageously designed and equipped in a way that it identifies the force, moment, or position proportion, indicated by $F_{ext,Boe}$, based on the measured or detected total force, moment, or position respectively, using parameters which describe the aerodynamic state of the aircraft and the state of the surrounding air (for example, flight speed, flight height, air density, etc.).

The suggested apparatus according to the invention further includes a regulator for regulating the actuator, e.g., using a control variable $S_{RE}$ which is determined, based on: the variable $F_{ext,Boe}$, the reference variables: $X_{soll}$ and $\dot{X}_{soll}$, and the regulating variables generated as a result of the actuator acting on the control and detected by a sensor system (second sensor system): $X_A$ and $\dot{X}_A$, wherein the regulator has a regulation behavior which enables the compensation of the forces, moments, or positions produced by gusts, as indicated by the variable $F_{ext,Boe}$. The second sensor system for identifying or detecting the regulating variables $X_A$ and $\dot{X}_A$ includes, depending on the regulatory philosophy implemented in the regulator, at least one force or moment sensor (if the regulator is a force regulator) or at least one position sensor (if the regulator is a position regulator).

Herein, the term "compensate" is used in the meaning of "reduced as much as possible" the forces, moments, or positions of the control surface produced by gusts. Ideally, the load on the control surface resulting from gusts (gust load) is completely removed by the application of the variable $F_{ext,Boe}$ in regulating the actuator.

If a control surface is propelled by more than one actuator, these actuators are generally regulated in a way that the forces, moments, or positions, as indicated by the variable $F_{ext,Boe}$, produced by the gusts are compensated.

An advantageous further development of the suggested apparatus is characterized in that the (force, moment, or position) regulator has a processor which works with a processor frequency PT1 and the flight control system has a processor which works with a processor frequency PT2, wherein: PT1>PT2, particularly PT1>2*PT2. Particularly in the event of occurring gusts acting from outside the aircraft on the control surfaces, this enables a fast and thus effective regulation of the actuators with gust load compensation that affects the associated control surfaces.

The suggested apparatus enables a reduction of the effect of gust loads acting on the control surfaces, without using a central flight guidance computer. In contrast to the related art, the external forces or moments, respectively, acting on the control surface or positions (deflections) of the control surface, due to gusts are herein directly locally (i.e., in the actuator, at the actuator, at/in the drive train, or at the control surface) detected by a respective force, moment, or position sensor. Particularly advantageously, the actuator itself is the sensor. With the suggested regulator, the "rigidity" of the regulation behavior for compensating the identified gust load is reduced, and thus the "flexibility" of the regulation behavior regarding forces, moments, or positions due to the impact of gusts are selectively increased.

Using the suggested apparatus, at least the gust loads acting on the control surfaces of the aircraft which are moved by the actuators are compensated. Ideally (complete compensation), the gust loads on the control surfaces are thus compensated to "zero". However, the gust loads acting on the other structural parts of the aircraft, e.g., fuselage, airfoil, empennages, etc., are not reduced, even in the event of a complete compensation of the gust loads acting on the control surfaces. Particularly in the event of a higher frequency of the regulator in comparison to the flight guidance system and the anatomy of the regulator, it is possible to compensate gust loads on the control surfaces as much as possible, which is not possible with gust reduction systems of the prior art. The contribution achievable by the suggested apparatus for reducing gust loads on the entire aircraft depends on the ratio of the total area of the aircraft, which is affected by the occurrence of gusts on the aircraft, to the area of the control surface which is controlled using the apparatus suggested herein. Depending on the design of the aircraft, this contribution is within a range of less than 10% of the gust loads acting on the entire aircraft, if it is considered that the gust may also act on the entire aircraft.

An advantageous further development of the suggested apparatus is characterized in that the regulator has a regulation behavior, wherein the forces, moments, or positions, indicated by the variable $F_{ext,Boe}$, produced by gusts on the respective control surface are overcompensated. In this case, not only are the gust loads on the respective control surface compensated, but additionally, the respective control surface is controlled in a way that an additional force, moment, or position is transmitted to the aircraft structure which counteracts the gust load detected at the control surface. With this further development, an active deflection of the control surface for reducing the gust loads on the entire aircraft is initiated by the regulator, wherein the gust loads, in contrast to the prior art, are detected by a force, moment, or position sensor of the respective control surface. In contrast to the prior art, this enables a faster and autonomous reaction and thus an effective reduction of occurring gust loads. With this further development, the gust loads which act on the entire aircraft may be reduced within a range of up to 15% of the gust loads acting on the entire aircraft.

An advantageous further development of the suggested apparatus is characterized in that a feed-forward controller for the reference variables: $X_{soll}$ and $\dot{X}_{soll}$ is provided in connection with the apparatus, wherein the actuator is controlled with a control variable $S_{SOLL}$, which is a sum of a control variable $S_{FV}$ output from the feed-forward controller and the control variable $S_{RF}$ output from the regulator: $S_{SOLL}=S_{FV}+S_{RE}$. The feed-forward controller uses the currently detected regulating variables: $X_A$ and $\dot{X}_A$ of the actuator A for the associated control surface, and the respective reference variables $X_{soll}$ and $\dot{X}_{soll}$ as input.

The feed-forward controller enables the compensation of friction in the actuator, and/or compensation of friction in the drive train assigned to the actuator A, as well as particularly the compensation of an air force on the control surface (without the impact of gusts) which is to be expected due to the deflection of the control surface according to $X_{soll}$ and $\dot{X}_{soll}$.

Depending on the type of the given reference variable $X_{soll}$ (position, force, or moment), the regulator is advantageously a position regulator, a rate of change regulator, or a force regulator. If the regulator is designed as a position regulator, it directly regulates advantageously the current position, i.e., without using a cascade regulator. The regulator is further advantageously arranged at the actuator or in a direct environment of the actuator. Thus, particularly long-signal propagation times are prevented and faster reaction times are achieved. An advantageous further development of the suggested apparatus is characterized in that the regulator uses the following regulating model:

$$S_{RE}=(X_A-X_{soll})*c+(\dot{X}_A-\dot{X}_{soll})*d \qquad (1)$$

with:

$S_{RE}$: control variable of the regulator, indicating a position, force, or moment, $X_A$: regulating variable which indicates a position, force, or moment, $\dot{X}_A$: time derivative of the regulating variable $X_A$, $X_{soll}$: reference variable which indicates position, force, or moment, $\dot{X}_{soll}$: reference variable that indicates time derivative of variable $X_{soll}$, c: rigidity, and d: dampening.

Constituent variables $S_{RF}$ and $S_{FV}$, which are added in order to generate control variable $S_{SOLL}$ can indicate a position, force, or moment. A change of the regulation behavior during the impact of external gust loads is particularly achieved by a respective change of the rigidity, i.e., particularly that the rigidity c is selected to be low in the event of $F_{ext,Boe}=0$ or $|F_{ext,Boe}|>G1$ (G1=given limit).

In the event that a feed-forward controller is present, the rigidity c is selected to be low and is not changed, such that there will generally be a "flexible" regulation behavior in the event of positions, forces, or moments produced as a result of external gusts loads on a control surface. In this case, the feed-forward controller is designed rigidly such that a respective "rigid" direct actuation of the actuator by the reference variables prior to the control occurs in the event of the presence of a reference variable $X_{soll}$ which deviates from an aerodynamic neutral position. The summation of the control variable $S_{FV}$ of the feed-forward controller and the control variable $S_{RE}$ of the regulator: $S_{SOLL}=S_{FV}+S_{RE}$, ensures on the one hand that the control surface achieves the deflection required for the intended flight guidance, and on the other hand that the regulation behavior enables compensation of occurring gust loads due to the regulator and the rigidity c selected to be low.

An advantageous further development of the suggested apparatus is characterized in that the regulator uses the following regulating model:

$$S_{RE}=X_{soll}+F_{ext,Boe}*k+\dot{X}_A*d \qquad (2)$$

with:

$S_{RE}$: control variable of the regulator, indicating a position, a force, or a moment, $X_{soll}$: target position, force, or moment of the actuator, $F_{ext,Boe}$: variable indicating position, force, or moment produced as a result of gusts on the control surface, $X_A$: regulating variable which indicates a position, force, or moment, $\dot{X}_A$: time derivative of the regulating variable $X_A$, k: constant, and d: dampening.

Constituent variables $S_{RE}$ and $S_{FV}$, which are added in order to generate control variable $S_{SOLL}$, can indicate a position, force, or moment. Advantageously, the rigidity c, and/or the dampening d, and/or the parameter k are specified as constants. Advantageously, the rigidity c, and/or the dampening d, and/or the parameter k are specified depending on a current flight condition of the aircraft. Advantageously, the rigidity c, and/or the dampening d, and/or the parameter k are specified depending on a frequency range of the positions, forces, or moments, indicated by the variable $F_{ext,Boe}$, as identified by the sensor system and acting from outside the aircraft on the respective control surface. Thus, the rigidity c, and/or the dampening d, and/or the parameter k may vary linearly or non-linearly.

An advantageous further development of the suggested apparatus is characterized in that the rigidity c has a first value c1 which is reduced to a second value c2 in the event of $F_{ext,Boe} \neq 0$ or $|F_{ext,Boe}|>G1$ (G1=specified limit), wherein c2<c1, and wherein c2 is selected in a way that $F_{ext,Boe}$ is completely compensated or overcompensated. For overcompensation of the position, force or moment, indicated by variable $F_{ext,Boe}$, the rigidity c advantageously has negative values. The regulation behavior of the regulator in the presence of gust loads $F_{ext,Boe} \neq 0$ or $|F_{ext,Boe}|>G1$ (G1=specified limit) on the control surface is thus "flexible" or "elastic". In the event of a respective choice of rigidities, a gust load occurring at the control surface may be compensated nearly completely.

Similarly, a further development of the suggested apparatus is characterized in that the parameter k has a first value k1 which is reduced to a second value k2 in the event of $F_{ext,Boe} \neq 0$ or $|F_{ext,Boe}|>G1$ (G1=specified limit), wherein k2<k1, and wherein k2 is selected in a way that $F_{ext,Boe}$ is completely compensated or overcompensated. For overcompensation of the gust load $F_{ext,Boe}$, k may have negative values. The actuator includes advantageously an electric motor (with or without transmission). Advantageously, the control variable $S_{RE}$ in this case can be a target position, force, or moment which the regulator can output to the actuator, thus regulating a current of the electric motor. Similarly, the control variable $S_{SOLL}$ can be a target position, force, or moment which is a sum of the control variables $S_{FV}$ and $S_{RV}$, and is output to the actuator from the adder, thus controlling a current of the electric motor.

An advantageous further development of the suggested apparatus is characterized in that the sensor system has a force, moment, or position sensor for measuring a total force, moment, or position indicated by variable $F_{ext,Ges}$, acting from outside the aircraft on the control surface, wherein $F_{ext,Ges}=F_{ext,Boe}+F_{ext,Rest}$, wherein $F_{ext,Rest}$ indicates a force, moment, or position of the control surface without the presence of gusts: $F_{ext,Boe}=0$, and the sensor system is designed and equipped in a way that, based on the reference variables $X_{soll}$ and $\dot{X}_{soll}$, a current flight speed of the aircraft $V_{LuftFZ}$, a current altitude $H_{LuftFZ}$ of the aircraft, and a current temperature $T_{LuftFZ}$ of the air surrounding the aircraft, an estimation of the force, moment, or position, indicated by variable $F_{ext,Rest}^*$, acting on the control surface without the presence of gusts is performed. Based on this estimation of the force, moment, or position without gusts indicated by $F_{ext,Rest}^*$ and the measurement of the total force, moment, or position indicated by $F_{ext,Ges}$, it is thus possible to identify the additional force, moment, or position indicated by $F_{ext,Boe}$, as produced by gusts.

Alternatively, the force, moment, or position indicated by variable $F_{ext,Boe}$, may be identified using a suitable frequency filtering of the measured variable $F_{ext,Ges}$ based on the total force, moment, or position measured by the sensor system. It is expected that the forces, moments, or positions produced by gusts are higher frequency force, moment, or position portions and may thus be distinguished from positions (deflections) of the control surfaces, which are specifically generated for flight guidance, and forces or moments (low frequency) accomplished by the flight guidance. A frequency filter is to be selected accordingly. The frequency filter is advantageously specified particularly depending on a dynamic condition (e.g., the flight speed, the flight height, etc.) and/or a configuration of the aircraft.

A second aspect of the present invention relates to an aircraft with an apparatus as discussed previously. Advantageously, the regulator is arranged in the aircraft at the actuator or in close proximity to the actuator. This enables short signal propagation times between the regulator and the sensor system, and thus a reduction of actuator reaction times, and thus an improved effective reduction of additional gust loads.

Advantageous further developments of the aircraft are caused by a similar and/or analogous application of the embodiments described previously regarding the apparatus according to the invention.

A third aspect of the present invention relates to a method of reducing gust loads acting on a number n of aerodynamic control surfaces of an aircraft, with n≥1, wherein each control surface is movable by at least one actuator, and a flight control system provides reference variables $X_{soll}$ and $\dot{X}_{soll}$ for actuating the actuator, wherein $X_{soll}$ indicates a target position, a target force, or a target moment associated with the at least one actuator, and $\dot{X}_{soll}$ indicates a time derivative of $X_{soll}$.

The suggested method according to the invention includes the following steps. In a first step, the positions, forces or moments, indicated by a variable $F_{ext,Boe}$, produced by gusts acting from outside the aircraft on the control surface are identified using a first sensor system. In a second step, the actuator is regulated with control variable $S_{RE}$ using the regulator based on: the variable $F_{ext,Boe}$, the reference variables: $X_{soll}$ and $\dot{X}_{soll}$, and reference variables resulting from the actuator acting on the control surface as detected by a second sensor system: $X_A$ and $\dot{X}_A$, wherein the method is carried out in a way that the regulation of the actuator compensates the positions, forces, or moments that are produced by gusts acting on the control surface, as indicated by $F_{ext,Boe}$ In an advantageous further development of the suggested method, the actuator is regulated in a way that the positions, forces, or moments, indicated by the variable $F_{ext,Boe}$, as produced by gusts are overcompensated.

An advantageous further development of the suggested method is characterized in that a feed-forward controller for the reference variables: $X_{soll}$ and $\dot{X}_{soll}$ is provided, wherein the actuator is controlled with a control variable $S_{SOLL}$, which is the sum of the control variable $S_{FV}$ of the feed-forward controller and the control variable $S_{RE}$ of the regulator: $S_{SOLL}=S_{FV}+S_{RE}$. For the feed-forward control, the regulating variables: $X_A$ and $\dot{X}_A$ currently detected by the second sensor system are provided to the feed-forward controller. Depending on the design of the flight guidance control, the regulator is a position regulator, a rate of change regulator, or a force regulator.

An advantageous further development of the suggested method is characterized in that the regulator uses the following regulating model (first regulating model):

$$S_{RE}=(X_A-X_{soll})*c+(\dot{X}_A-\dot{X}_{soll})*d$$

with:

$S_{RE}$: control variable of the regulator, indicating a position, force, or moment $X_A$: regulating variable which indicates a position, force, or moment $\dot{X}_A$: time derivative of the regulating variable $X_A$, $X_{soll}$: reference variable which indicates a position, force, or moment, $\dot{X}_{soll}$: reference variable that indicates a time derivative of $X_{soll}$, c: rigidity, and d: dampening.

In an embodiment, the regulator can directly regulate the actuator using the control variable $S_{RE}$ according to the first regulating model set forth immediately above. In an embodiment providing a feed-forward controller, constituent variables $S_{RE}$ of the regulator and $S_{FV}$ of the feed-forward controller can be added in order to generate a control variable $S_{SOLL}$, which can also indicate a position, force, or moment, for controlling the actuator. An advantageous further development of the suggested method is characterized in that the regulator uses the following regulating model (second regulating model):

$$S_{RE}=X_{soll}+F_{ext,Boe}*k+\dot{X}_A*d$$

with:

$S_{RE}$: control variable of the regulator, indicating a position, force, or moment, $X_{soll}$: target position, force, or moment of the actuator, $F_{ext,Boe}$: variable indicating position, force, or moment produced as a result of gusts on the control surface, $X_A$: regulating variable which indicates a position, force, or moment, $\dot{X}_A$: time derivative of the regulating variable $X_A$, k: parameter, and d: dampening.

In an embodiment, the regulator can directly regulate the actuator using the control variable $S_{RE}$ according to the second regulating model set forth immediately above. In an embodiment providing a feed-forward controller, constituent variables $S_{RE}$ of the regulator and $S_{FV}$ of the feed-forward controller can be added in order to generate a control variable $S_{SOLL}$, which can also indicate a position, force, or moment, for controlling the actuator. Advantageously, the rigidity c, and/or the dampening d, and/or the parameter k are specified as constants. Alternatively, the rigidity c, and/or the dampening d, and/or the parameter k are specified depending on flight conditions of the aircraft and/or frequency-based depending on the frequency range of external forces on the control surface. The values of c, d, k may vary linearly or non-linearly.

An advantageous further development of the suggested method is characterized in that the rigidity c has a first value c1 which is reduced to a second value c2 in the event of $F_{ext,Boe} \neq 0$ or $|F_{ext,Boe}| > G1$ (G1=specified limit), wherein c2<c1, and wherein c2 is selected in a way that $F_{ext,Boe}$ is completely compensated or overcompensated.

An advantageous further development of the suggested method is characterized in that the parameter k has a first value k1 which is reduced to a second value k2 in the event of $F_{ext,Boe} \neq 0$ or $|F_{ext,Boe}| > G1$ (G1=specified limit), wherein k2<k1, and wherein k2 is selected in a way that $F_{ext,Boe}$ is completely compensated or overcompensated.

Regarding the mentioned overcompensation of the positions, forces, or moments indicated by $F_{ext,Boe}$, the rigidity c or, respectively, the parameter k may have negative values.

An advantageous further development of the suggested method is characterized in that the measurement of a total position, force, or moment, indicated by $F_{ext,Ges}$, acting from outside on the control surface, wherein $F_{ext,Ges} = F_{ext,Boe} + F_{ext,Rest}$, is performed by a position, force, or moment sensor, wherein $F_{ext,Rest}$ designates a position, force, or moment of air acting on the control surface without the presence of gusts ($F_{ext,Boe}=0$), and based on the reference variables $X_{soll}$ and $\dot{X}_{soll}$, a current flight speed of the aircraft $V_{LufFZ}$, a current flight high $H_{LufFZ}$ of the aircraft, and a current temperature $T_{LufFZ}$ of the air surrounding the aircraft, an estimation of the position, force, or moment, indicated by $F_{ext,Rest}*$, acting on the control surface without the presence of gusts is performed. Based on this estimation of the force, moment, or position without gusts indicated by $F_{ext,Rest}*$ and the measurement of the total force, moment, or position indicated by $F_{ext,Ges}$, the additional force, moment, or position indicated by $F_{ext,Boe}$, which is produced by gusts is identified subsequently.

A further aspect of the invention relates to a computer system with a data processing apparatus, wherein the data processing apparatus is designed such that a method, as elaborated above, is executed on the data processing apparatus.

Another aspect of the invention relates to digital storage medium with electronically readable control signals, wherein the control signals can interact with a programmable computer system in such a way that a method, as elaborated above, is executed. Another aspect of the invention relates to a computer program product with a program code for executing the method, as elaborated above, stored on a machine-readable medium, if the program code is executed on a data processing apparatus.

Another aspect of the invention relates to a computer program with program codes for executing the method, as described above, if the program runs on a data processing apparatus.

For this purpose, the data processing apparatus can be designed as any known computer system known from the state of the art.

Other advantages, features and details will become apparent from the following description, in which at least one example embodiment is described in detail, with reference to the drawings, if applicable. Like, similar and/or analogue parts are indicated by like reference numerals.

DETAILED DESCRIPTION

Figure 1:
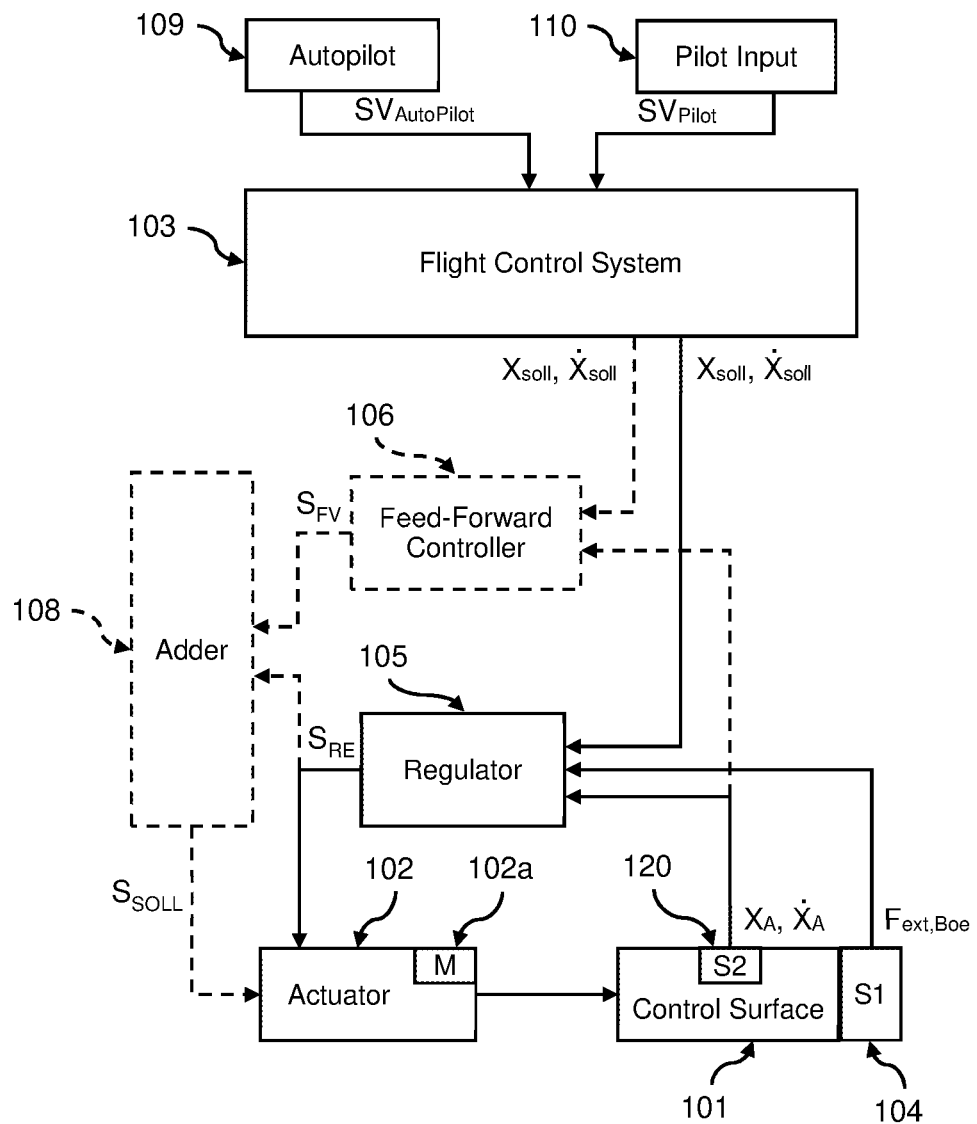
FIG. 1 shows a schematic diagram of an apparatus according to the invention.

FIG. 1 shows a schematic diagram of an apparatus according to the invention for reducing gust loads acting on a number n of an aerodynamic control surfaces of an aircraft, with n≥1. For example, the aircraft has an aerodynamic control surface 101, herein an elevator, which is movable by an actuator 102. Furthermore, the aircraft has a flight control system 103, which receives control specifications $SV_{Pilot}$ from input means 110 for a pilot, as well as control specifications $SV_{AutoPilot}$ from an autopilot 109. The input means 110 includes rudder pedals for specifying control signals for movement of the aircraft about the vertical axis, as well as a so-called "side stick" for specifying control signals for movements of the aircraft about the transverse and longitudinal axes. The flight control system 103 processes the control specifications of the input means 110 as well as the autopilot 109, and generates reference variables $X_{soll}$ and $\dot{X}_{soll}$ for actuating the actuator 102 of each aerodynamic control surface 101, for example, $X_{soll}$ herein indicates a target position of the actuator 102 and $\dot{X}_{soll}$ indicates a time derivative of $X_{soll}$. It should be noted that the reference variable $\dot{X}_{soll}$ can indicate a target position, force, or moment of the actuator 102, a drive terrain between the actuator 102 and the aerodynamic control surface 101, or the aerodynamic control surface 101. The apparatus includes a feed-forward controller 106 which receives reference variables $X_{soll}$ and $\dot{X}_{soll}$, and control variables $X_A$ and $\dot{X}_A$ generated as a result of the actuator 102 acting on the control surface 101, and generates a regulating variable $S_{FV}$ for regulating the actuator 102.

The apparatus includes a first sensor system (S1) 104 which identifies a position, force, or moment, indicated by a variable $F_{ext,Boe}$, produced by gusts acting from outside the aircraft on the control surface 101.

Furthermore, the apparatus includes a regulator 105 for regulating the actuator 102 based on the following variables: the variable $F_{ext,Boe}$, the reference variables: $X_{soll}$ and $\dot{X}_{soll}$, and control variables: $X_A$ and $\dot{X}_A$ generated as a result of the actuator 102 acting on the control surface 101 and detected by a second sensor system (S2) 120, wherein the sensor system 120 has a position sensor between the actuator 102 and the control surface 101 for identifying the control variables in a drive train of the actuator 102. The actuator 102 can include an electric motor (M) 102a that drives the drive train of the actuator. It should be noted that the second sensor system 120 can have an appropriate sensor (position, force, or moment sensor) in order to identify an actual position, force, or moment associated with the actuator 102, the drive terrain between the actuator 102 and the control surface 101, or the control surface 101. Thus, the control variable $X_A$ can indicate an actual position, force, or moment of the actuator 102, the drive terrain, or the control surface 101 as a result of the actuator 102 acting on the control surface 101, and the variable $\dot{X}_A$ indicates a time derivative of the variable $X_A$.

According to the invention, the regulator 105 is designed and equipped in such a way that it has a regulation behavior which enables the compensation of the position, force, or moment produced by gusts, as indicated by the variable $F_{ext,Boe}$, on the control surface 101 of the aircraft. In particular, the regulator 105 receives $F_{ext,Boe}$, $X_{soll}$ and $\dot{X}_{soll}$, and $X_A$ and $\dot{X}_A$, and generates a regulating variable $S_{RE}$ which regulates the actuator 102, such as by regulating a current of the electric motor 102a of the actuator 102 based on the regulating variable $S_{RE}$. In those cases where a feed-forward controller 106 is provided, regulating variable output of the feed-forward controller 106 provides a regulating variable $S_{FV}$, and regulating variable output of the regulator 105 provides a regulating variable $S_{RE}$. Both regulating variables are combined as a single regulating variable $S_{SOLL}$, $=S_{FV}+S_{RE}$ in an adder 108. These elements are illustrated in FIG. 1 using dashed lines for clarity. Accordingly, the regulating variable $S_{SOLL}$, is used as a regulating input to the actuator 102 which acts on the control surface 101 based on $S_{SOLL}$, thus providing compensation of the position, force, or moment produced by gusts on the control surface 101. Similarly to the regulating variable $S_{RE}$, the regulating variable $S_{SOLL}$ can be used to regulate the current of the electric motor 102a of the actuator 102.

Figure 2:
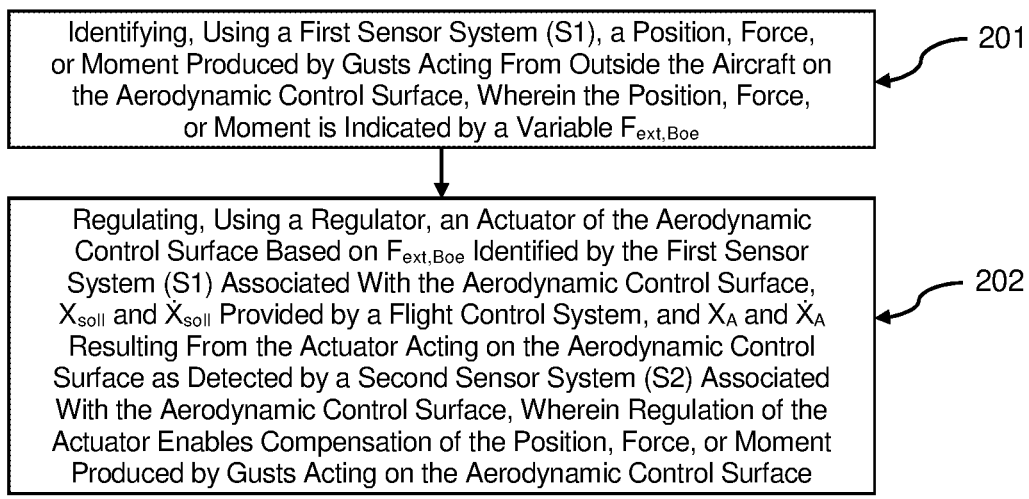
FIG. 2 shows a schematic flow diagram of a method according to an embodiment of the invention.

FIG. 2 shows a schematic flow diagram of a method according to an embodiment of the invention for reducing gust loads acting on a number n of aerodynamic control surfaces of an aircraft, with n≥1, wherein each aerodynamic control surface 101 is movable by at least one actuator 102, and a flight control system 103 provides reference variables: $X_{soll}$ and $\dot{X}_{soll}$ for actuating the actuator 102 of each aerodynamic control surface 101, wherein $X_{soll}$ indicates a target position, a target force, or a target moment of the actuator 102, and $\dot{X}_{soll}$ indicates a time derivative of $X_{soll}$. The method includes the following steps. In a first step 201, a position, force, or moment produced by gusts acting from outside the aircraft on the control surface 101, as indicated by a variable $F_{ext,Boe}$, is identified by a first sensor system (S1) 104. In a second step 202, the actuator 102 is regulated using the regulator 105 based on: the variable $F_{ext,Boe}$, the reference variables: $X_{soll}$ and $\dot{X}_{soll}$, and the regulating variables generated as a result of the actuator 102 acting on the control surface 101 and detected by a second sensor system (S2) 120: $X_A$ and $\dot{X}_A$, wherein the regulation carried out in such a way that the position, force, or moment produced by gusts on the control surface 101 is compensated.

Figure 3:
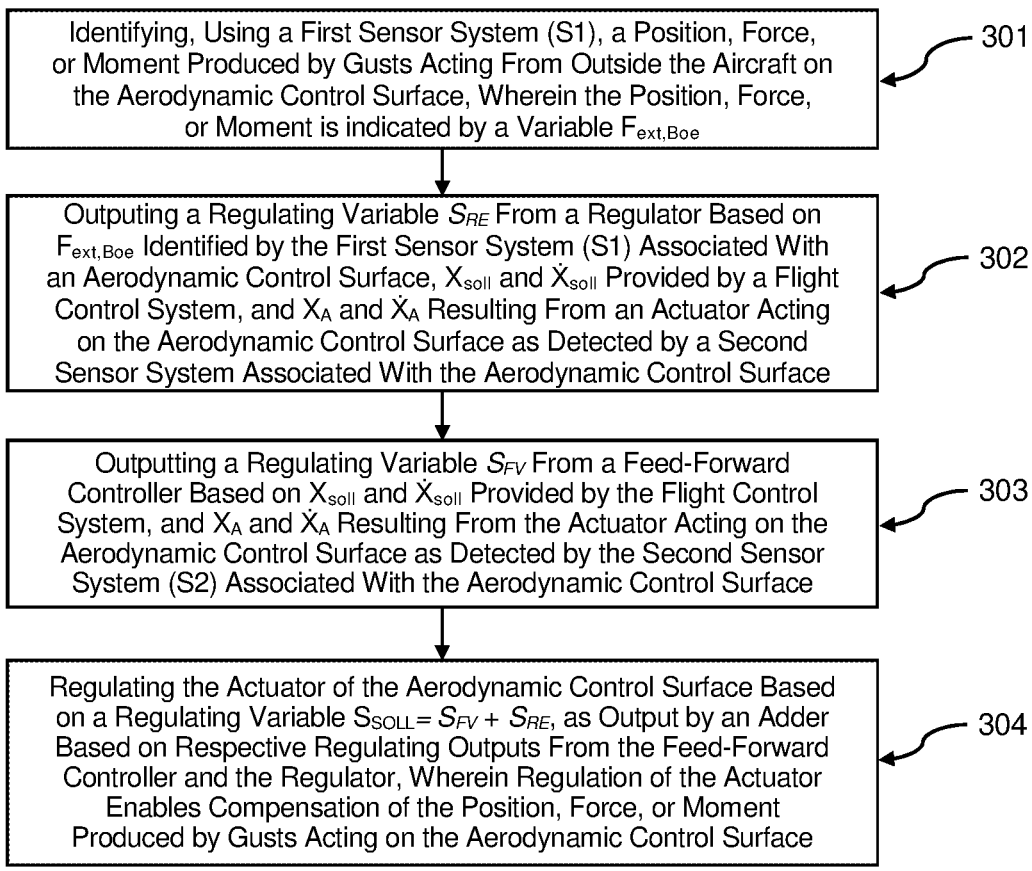
FIG. 3 shows a schematic flow diagram of a method according to another embodiment of the invention.

FIG. 3 shows a schematic flow diagram of another method according to another embodiment of the invention for reducing gust loads acting on a number n of aerodynamic control surfaces of an aircraft, with n≥1, wherein each aerodynamic control surface 101 is movable by at least one actuator 102, and a flight control system 103 provides reference variables: $X_{soll}$ and $\dot{X}_{soll}$ for actuating the actuator 102 of each aerodynamic control surface 101, wherein $X_{soll}$ indicates a target position, a target force, or a target moment of the actuator 102, and $\dot{X}_{soll}$ indicates a time derivative of $X_{soll}$. The method includes the following steps. In a first step 301, a position, force, or moment produced by gusts acting from outside the aircraft on the control surface 101, as indicated by a variable $F_{ext,Boe}$, is identified by a first sensor system (S1) 104. In a second step 302, a regulating variable $S_{RE}$ is output from a regulator 105 based on $F_{ext,Boe}$ identified by the first sensor system (S1) associated with the control surface 101, $X_{soll}$ and $\dot{X}_{soll}$ provided by the flight control system 103, and $X_A$ and $\dot{X}_A$ resulting from the actuator 102 acting on the control surface 101 as detected by the second sensor system (S2) 120 associated with the control surface 101. In a third step 303, a regulating variable $S_{FV}$ is output from a feed-forward controller 106 based on the reference variables $X_{soll}$ and $\dot{X}_{soll}$ provided by the flight control system 103, and reference variables $X_A$ and $\dot{X}_A$ resulting from the actuator 102 acting on the control surface 101 as detected by the second sensor system (S2) 120 associated with the control surface 101. In the fourth step, the actuator 102 of the control surface 101 is regulated based on a regulating variable $S_{SOLL}=S_{FV}+S_{RE}$, as output by an adder 108 based on respective regulating outputs from the feed-forward controller 106 and the regulator 105, wherein regulation of the actuator 102 enables compensation of the position, force, or moment produced by gusts acting on the control surface 101.

Although the invention has been further illustrated and explained by way of preferred example embodiments, the invention is not limited by the disclosed examples and other variations can be derived therefrom by the person skilled, without departing from the scope of the invention. It is thus understood that a plurality of possible variations exists. It is also understood that embodiments presented by way of example are really merely examples that should not be construed as limiting the scope, the possible applications or the configuration of the invention in any way. The above description and the description of the figures rather enable the person skilled in the art to concretely implement the example embodiments, wherein the person skilled in the art, in the knowledge of the disclosed inventive concept, can make numerous changes, for example, with respect to the function or the arrangement of individual elements, mentioned in an example embodiment, without departing from the scope defined by the claims and their legal equivalences, such as further explanations in the description.

LIST OF REFERENCE NUMERALS

101 control surface
102 actuator
102a motor of actuator
103 flight control system
104 first sensor system (S1) for detecting variable $F_{ext,Boe}$
105 regulator
106 feed-forward controller
108 adder
109 autopilot
110 input means for input of control specifications by a pilot
120 second sensor system (S2) for detecting regulating variables $X_A$ and $\dot{X}_A$
$SV_{AutoPilot}$ control specifications from the autopilot
$SV_{Pilot}$ control specifications from the pilot
$X_{soll}$ target position, force, or moment of the actuator
$\dot{X}_{soll}$ time derivative of $X_{soll}$ $S_{FV}$ control variable of the feed-forward controller $S_{RE}$ control variable of the regulator
$S_{SOLL}$ control variable as a sum of $S_{FV}$ and $S_{RE}$
$X_A$ regulating variable of the actuator indicating position, force, or moment
$\dot{X}_A$ regulating variable of the actuator indicating time derivative of $X_A$
$F_{ext,Boe}$ variable indicating position, force, or moment produced as a result of gusts on the control surface
201, 202 method steps
301-304 method steps

The invention claimed is:

1. An apparatus to reduce gust loads acting on a number n of aerodynamic control surfaces of an aircraft, with n≥1, wherein each aerodynamic control surface of the aerodynamic control surfaces is movable by at least one actuator, and a flight control system provides reference variables $X_{soll}$ and $\dot{X}_{soll}$ for actuating the at least one actuator of each aerodynamic control surface, wherein $X_{soll}$ indicates a target position, a target force, or a target moment associated with the at least one actuator, and $\dot{X}_{soll}$ indicates a time derivative of $X_{soll}$, wherein per aerodynamic control surface the apparatus comprises:
   a first sensor system configured to identify a position, force, or moment produced by gusts acting from outside the aircraft on the aerodynamic control surface, wherein the position, force, or moment is indicated by a variable $F_{ext,Boe}$;
   a regulator configured to output a control variable $S_{RE}$ based on the variable $F_{ext,Boe}$, the reference variables $X_{soll}$ and $\dot{X}_{soll}$, and reference variables $X_A$ and $\dot{X}_A$, the reference variables $X_A$ and $\dot{X}_A$ resulting from the at least one actuator acting on the aerodynamic control surface as detected by a second sensor system associated with the aerodynamic control surface; and
   a feed-forward controller configured to output a control variable $S_{FV}$ based on the reference variables $X_{soll}$ and $\dot{X}_{soll}$, and the reference variables $X_A$ and $\dot{X}_A$, wherein the at least one actuator is regulated with a control variable $S_{SOLL}$ which is a sum of the control variable $S_{FV}$ of the feed-forward controller and the control variable $S_{RE}$ of the regulator: $S_{SOLL}=S_{FV}+S_{RE}$, wherein regulation of the at least one actuator enables compensation of the position, force, or moment produced by gusts acting on the aerodynamic control surface.

2. The apparatus according to claim 1, wherein the regulator has a processor PR1 which works with a processor frequency PT1, and the flight control system has a processor $PR_F$ which works with a processor frequency PT2, wherein PT1>PT2.

3. The apparatus according to claim 1, wherein the regulator uses the following regulating model:

$$S_{RE}=(X_A-X_{soll})*c+(\dot{X}_A-\dot{X}_{soll})*d$$

with:
$S_{RE}$: control variable of the regulator, indicating a position, force, or moment,
$X_A$: regulating variable which indicates a position, force, or moment,
$\dot{X}_A$: regulating variable which indicates a time derivative of the regulating variable $X_A$,
$X_{soll}$: reference variable which indicates a position, force, or moment,
$\dot{X}_{soll}$: reference variable which indicates a time derivative of the reference variable $X_{soll}$,
c: rigidity, and
d: dampening.

4. The apparatus according to claim 1, wherein the regulator uses the following regulating model:

$$S_{RE}=X_{soll}+F_{ext,Boe}*k+\dot{X}_A*d$$

with:
$S_{RE}$: control variable of the regulator, indicating a position, force, or moment,
$X_{soll}$: reference variable which indicates a target position, force, or moment of the actuator,
$F_{ext,Boe}$: variable indicating position, force, or moment as a result of gusts on the control surface,
$X_A$: regulating variable which indicates a position, force, or moment,
$\dot{X}_A$: regulating variable which indicates a time derivative of the regulating variable $X_A$,
k: constant, and
d: dampening.

5. The apparatus according to claim 1, wherein the at least one actuator includes an electric motor.

6. The apparatus according to claim 5, wherein a current of the electric motor is regulated based on the control variable $S_{SOLL}$.

7. The apparatus according to claim 1, wherein:
the first sensor system is configured to measure a total force $F_{ext,Ges}$ acting from outside the aircraft on the aerodynamic control surface, $F_{ext,Ges}=F_{ext,Boe}+F_{ext,Rest}$, wherein $F_{ext,Rest}$: air force acting on the aerodynamic control surface without a presence of gusts: $F_{ext,Boe}=0$; and
the first sensor system is further configured to estimate an air force $F_{ext,Rest}*$ acting on the aerodynamic control surface without presence of gusts, based on the reference variables $X_{soll}$ and $\dot{X}_{soll}$, a current flight speed of the aircraft $V_{LufFZ}$, a current flight altitude $H_{LufFZ}$ of the aircraft, and a current temperature $T_{LufFZ}$ of air surrounding the aircraft, wherein $F_{ext,Boe}$ is calculated as follows: $F_{ext,Boe}=F_{ext,Ges}-F_{ext,Rest}*$.

8. An aircraft with an apparatus according to claim 1.

9. The apparatus according to claim 1, wherein the regulator has a processor PR1 which works with a processor frequency PT1, and the flight control system has a processor $PR_F$ which works with a processor frequency PT2, wherein PT1>2*PT2.

10. A method of reducing gust loads acting on a number n of aerodynamic control surfaces of an aircraft, with n≥1, wherein each aerodynamic control surface of the aerodynamic control surfaces is movable by at least one actuator, and a flight control system provides reference variables $X_{soll}$ and $\dot{X}_{soll}$ for actuating the at least one actuator of each aerodynamic control surface, wherein $X_{soll}$ indicates a target position, a target force, or a target moment associated with the at least one actuator, and $\dot{X}_{soll}$ indicates a time derivative of $X_{soll}$, wherein per aerodynamic control surface the method comprises:
   identifying, using a first sensor system, a position, force, or moment produced by gusts acting from outside the aircraft on the aerodynamic control surface, wherein the position, force, or moment is indicated by a variable $F_{ext,Boe}$;
   outputting, using a regulator, a control variable $S_{RE}$ based on the variable $F_{ext,Boe}$, the reference variables $X_{soll}$ and $\dot{X}_{soll}$, and reference variables $X_A$ and $\dot{X}_A$, the reference variables $X_A$ and $\dot{X}_A$ resulting from the at least one actuator acting on the aerodynamic control surface as detected by a second sensor system associated with the aerodynamic control surface; and outputting, using a feed-forward controller, a control variable $S_{FV}$ based on the reference variables $X_{soll}$ and $\dot{X}_{soll}$, and the reference variables $X_A$ and $\dot{X}_A$, wherein the at least one actuator is regulated with a control variable $S_{SOLL}$ which is a sum of the control variable $S_{FV}$ of the feed-forward controller and the control variable $S_{RE}$ of the regulator: $S_{SOLL}=S_{FV}+S_{RE}$, wherein regulation of the at least one actuator enables compensation of the position, force, or moment produced by gusts acting on the aerodynamic control surface.

11. The method according to claim 10, wherein the method comprises:
providing the regulator with a processor PR1 which works with a processor frequency PT1; and
providing the flight control system with a processor $PR_F$ which works with a processor frequency PT2, wherein PT1>PT2.

12. The method according to claim 10, wherein the method comprises:
providing the regulator with a processor PR1 which works with a processor frequency PT1; and
providing the flight control system with a processor $PR_F$ which works with a processor frequency PT2, wherein PT1>2*PT2.

13. The method according to claim 10, wherein the method comprises the regulator using the following model:

$$S_{RE}=(X_A-X_{soll})*c+(\dot{X}_A-\dot{X}_{soll})*d$$

with:
$S_{RE}$: control variable of the regulator, indicating a position, force, or moment,
$X_A$: regulating variable which indicates a position, force, or moment,
$\dot{X}_A$: time derivative of the regulating variable $X_A$,
$X_{soll}$: reference variable which indicates a position, force, or moment,
$\dot{X}_{soll}$: reference variable which indicates a time derivative of the reference variable $X_{soll}$,
c: rigidity, and
d: dampening.

14. The method according to claim 10, wherein the method comprises the regulator using the following regulating model:

$$S_{RE}=X_{soll}+F_{ext,Boe}*k+\dot{X}_A*d$$

with:
$S_{RE}$: control variable of the regulator, indicating a position, force, or moment,
$X_{soll}$: a target position, force, or moment of the actuator,
$F_{ext,Boe}$: variable indicating position, force, or moment as a result of gusts on the control surface,
$X_A$: regulating variable which indicates a position, force, or moment,
$\dot{X}_A$: regulating variable which indicates a time derivative of the regulating variable $X_A$,
k: constant, and
d: dampening.

15. The method according to claim 10, wherein the at least one actuator includes an electric motor.

16. The method according to claim 15, wherein regulation comprises regulating a current of the electric motor based on the control variable $S_{SOLL}$.

17. The method according to claim 10, wherein the method comprises:
measuring, using the first sensor system, a total force $F_{ext,Ges}$ acting from outside the aircraft on the aerodynamic control surface, $F_{ext,Ges}=F_{ext,Boe}+F_{ext,Rest}$, wherein $F_{ext,Rest}$: air force acting on the aerodynamic control surface without a presence of gusts: $F_{ext,Boe}=0$; and
estimating, using the first sensor system an air force $F_{ext,Rest}*$ acting on the aerodynamic control surface without presence of gusts, based on the reference variables $X_{soll}$ and $\dot{X}_{soll}$, a current flight speed of the aircraft $V_{LufFZ}$, a current flight altitude $H_{LufFZ}$ of the aircraft, and a current temperature $T_{LufFZ}$ the air surrounding the aircraft, wherein $F_{ext,Boe}$ is calculated as follows: $F_{ext,Boe}=F_{ext,Ges}-F_{ext,Rest}*$.

* * * * *